United States Patent
Roussel et al.

(10) Patent No.: US 8,655,301 B2
(45) Date of Patent: Feb. 18, 2014

(54) FREQUENCY AGILE DUPLEX FILTER

(71) Applicant: Research In Motion Limited, Waterloo (CA)

(72) Inventors: Alain Roussel, Gatineau (CA); Charles W. T. Nicholls, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/928,117

(22) Filed: Jun. 26, 2013

(65) Prior Publication Data

US 2013/0295860 A1 Nov. 7, 2013

Related U.S. Application Data

(60) Continuation of application No. 13/620,495, filed on Sep. 14, 2012, now Pat. No. 8,498,584, which is a continuation of application No. 13/540,263, filed on Jul. 2, 2012, now Pat. No. 8,351,889, which is a division of application No. 13/110,427, filed on May 18, 2011, now Pat. No. 8,213,877, which is a continuation of application No. 12/717,026, filed on Mar. 3, 2010, now Pat. No. 7,970,354, which is a division of application No. 11/615,450, filed on Dec. 22, 2006, now Pat. No. 7,702,295.

(51) Int. Cl.
*H04B 1/10* (2006.01)

(52) U.S. Cl.
USPC ......... 455/307; 455/306; 455/63.1; 455/63.3; 455/78; 455/102; 375/237; 375/238; 375/239; 375/241

(58) Field of Classification Search
USPC .............. 455/63.1, 63.3, 78, 570, 114.2, 213, 455/306, 307, 61, 73, 102, 108; 375/237–239, 241, 242, 268, 271, 298
See application file for complete search history.

(56) References Cited

U.S. PATENT DOCUMENTS

| | | | |
|---|---|---|---|
| 3,696,429 A | 10/1972 | Tressa | |
| 3,699,444 A | 10/1972 | Ghose et al. | |
| 4,177,430 A | 12/1979 | Paul | |
| 4,991,165 A | 2/1991 | Cronyn | |
| 5,117,505 A | 5/1992 | Talwar | |
| 5,444,864 A | 8/1995 | Smith | |

(Continued)

OTHER PUBLICATIONS

Beaudin, Steve et al.; "A New SAW Band Reject Filter and its Applications in Wireless Systems"; IEEE Ultrasonics Symposium; 2002; pp. 147-151.

(Continued)

*Primary Examiner* — Tuan Pham
(74) *Attorney, Agent, or Firm* — Fish & Richardson P.C.

(57) ABSTRACT

Systems and methods are disclosed for an electronically adjustable signal filter system, which comprises, in some embodiments, a first filter coupled to an antenna coupling network and a second filter, a power amplifier coupled to the first filter, an antenna connected to an antenna coupling network, a pilot tone generator coupled to the first filter, and a first signal source connected to the power amplifier and first filter. In some embodiments, the power amplifier amplifies the first signal, the first filter places a notch into the first signal transmitted to the antenna coupling network, the antenna coupling network combines the first signal and a second signal received from the antenna and transmits a third signal to the second filter.

18 Claims, 10 Drawing Sheets

(56) References Cited

U.S. PATENT DOCUMENTS

| | | | |
|---|---|---|---|
| 5,691,978 | A | 11/1997 | Kenworthy |
| 6,018,644 | A * | 1/2000 | Minarik ........................ 455/82 |
| 6,229,992 | B1 | 5/2001 | McGeehan et al. |
| 6,539,204 | B1 | 3/2003 | Marsh et al. |
| 6,567,649 | B2 | 5/2003 | Souissi |
| 6,745,018 | B1 | 6/2004 | Zehavi et al. |
| 6,957,052 | B2 | 10/2005 | Kuehn |
| 6,958,647 | B2 | 10/2005 | Rabinovich et al. |
| 7,058,368 | B2 | 6/2006 | Nicholls et al. |
| 7,509,049 | B2 | 3/2009 | Lou et al. |
| 7,702,295 | B1 | 4/2010 | Nicholls et al. |
| 7,970,354 | B1 | 6/2011 | Nicholls et al. |
| 8,213,877 | B1 | 7/2012 | Nicholls et al. |
| 2004/0183624 | A1* | 9/2004 | Liang et al. .................. 333/134 |
| 2005/0200408 | A1 | 9/2005 | Benjamin et al. |
| 2006/0229030 | A1* | 10/2006 | Simon et al. ................... 455/78 |
| 2006/0273952 | A1 | 12/2006 | Krikorian et al. |

OTHER PUBLICATIONS

Chen, S. et al.; "Division-Free Duplex for Wireless Applications"; Electronics Letters; vol. 34, No. 2; Jan. 22, 1998; pp. 147-148.

Eid et al.; "Adaptive Nulling Loop control for 1.7-GHz Feedforward Linearization Systems"; IEEE Transactions and Microwave Theory and Techniques; vol. 45, No. 1; Jan. 1997; pp. 83-86.

Ghose, Rabindra N.; "Collocation of Receivers and High-Power Broadcast Transmitters"; IEEE Transactions on Broadcasting; vol. 34, No. 2; Jun. 1988; pp. 154-158.

Gong, Fan et al.; "A Novel Wideband Frequency-Tunable Feedforward Power Amplifier"; Tsinghua University; IEEE; 2002; pp. 1248-1251.

Jeong, Yong-Chae; "A Feedforward Power Amplifier with Loops to Reduce RX Band Noise and Intermodulation Distortion"; Technical Feature; Microwave Journal; Jan. 2002; 8 pages.

Jeong, Yong-Chae et al.; "A Design of the Noble Vector Modulator"; Chonbuk National University; Korea; 4 pages; Dec. 2000.

Jeong, Yong-Chae et al.; "A Novel Adaptive Feedforward Amplifier Using an Analog Controller"; Technical Feature, Microwave Journal Editorial Board; 4 pages; Apr. 1, 2003.

Jian, Chun-yun et al.; "SAW Band Reject Filter Performance at 850 MHz"; Nortel, Wireless Technology Labs; Canada; 4 pages; Sep. 2005.

Kang, Sanggee et al.; "Novel Analysis of the Cancellation Performance of a Feedforward Amplifier"; Electronics and Telecommunications Research Institute; Taejun, Korea; IEEE; 1997; pp. 72-76.

Kang, Sanggee et al.; "Adaptive Feedforward Amplifier Using Digital Controller"; Electronics and Telecommunication Research Institute; Chungnam National University; IEEE; 2003; pp. 2076-2079.

Kang, Sanggee et al.; "Adaptive Feedforward Amplifier Using Pilot Signal"; Electronics and Telecommunication Research Institute; Chungnam National University; IEEE; 2003; pp. 677-680.

Kannangara, Shyama et al.; "Adaptive Duplexer for Multiband Transreceiver"; W3.3; Victoria University, Australia; IEEE; 2003; pp. 381-384.

Legarda, Jon et al.; "An Adaptive Feedforward Amplifier under "Maximum Output" Control Method for UMTS Downlink Transmitters"; IEEE Transactions on Microwave Theory and Techniques; vol. 53, No. 8; Aug. 2005; pp. 2481-2486.

Narahashi, Shoichi et al.; "Extremely Low-Distortion Multi-Carrier Amplifier—Self-Adjusting Feed-Forward (SAFF) Ampliefier"; NTT Radio Communication Systems Laboratories; Japan; IEEE; 1991; pp. 1485-1490.

O'Sullivan, Tomas et al.; "Adaptive Duplexer Implemented Using Feedforward Technique with a BST Phase Shifter"; TH1A-3; IEEE MTT-S Digest; 2004; pp. 1299-1302.

O'Sullivan, Tomas et al.; "Adaptive Duplexer Implemented Using Single-Path and Multipath Feedforward Techniques with BST Phase Shifters"; IEEE Transactions on Microwave Theory and Techniques; vol. 53, No. 1; Jan. 2005; pp. 106-114.

Parsons, K.J. et al.; "Effect of Delay Mismatch on a Feedforward Amplifier"; IEEE Proc.-Circuits Devices Syst.; vol. 141, No. 2; Apr. 1994; pp. 140-144.

Roussel, Alain; "Feedforward Interference Cancellation System Applied to the 800 MHz CDMA Cellular Band"; Carelton University; Canada; Jan. 2003; 221 pages.

Schacherbauer, W. et al.; "An Interference Cancellation Technique for the Use in Multiband Software Radio Frontend Design"; 30th European Microwave Conference; Paris; 2000; pp. 341-344.

Schacherbauer, W. et al.; "A Flexible Multiband Frontend for Software Radios Using High If and Active Interference Cancellation"; WE4B-1, IEEE MTT-S Digest; 2001; pp. 1085-1088.

Silverman, Lawrence et al.; "Vector Modulator Enhances Feedforward Cancellation"; Design Feature-Vector Modulator, Microwaves & RF; Mar. 1998; pp. 83-84, 86-88 and 90.

Smith, Alison M. et al.; A Wideband Architecture for Adaptive Feedforward Linearization; Simon Fraser University; Canada; IEEE; 1998; pp. 2488-2492.

Talwar, Ashok K.; "Reduction of Noise and Distortion in Amplifiers Using Adaptive Cancellation"; Short-Papers; IEEE Transactions on Microwave Theory and Techniques; vol. 42, No. 6; Jun. 1994; pp. 1086-1087.

Thorton, William T. et al.; "Improved Design Techniques for the Realization of Linear Power Amplifiers for Wireless Transmitters"; University of California—San Diego; IEEE; 1999; pp. 151-155.

Williamson, Matthew et al.; "Performance Analysis of Adaptive Wideband Duplexer"; Victoria University; Australia; 5 pages; Dec. 2003.

Zhou, Jianyi et al.; "Design of a Wideband Adaptive Linear Amplifier with a DSB Pilot and Complex Coherent Detection Method"; Technical Feature, Microwave Journal Editorial Board; Apr. 2006; pp. 104-114.

Notice of Allowance issued in U.S. Appl. No. 11/615,450 on Dec. 2, 2009; 9 pages.

Supplemental Notice of Allowance issued in U.S. Appl. No. 11/615,450 on Mar. 11, 2010; 8 pages.

Office Action issued in U.S. Appl. No. 12/717,026 on May 18, 2010; 9 pages.

Office Action issued in U.S. Appl. No. 12/717,026 on Nov. 3, 2010; 8 pages.

Notice of Allowance issued in U.S. Appl. No. 12/717,026 on Feb. 15, 2011; 7 pages.

Office Action issued in U.S. Appl. No. 13/110,427 on Dec. 27, 2011; 10 pages.

Notice of Allowance issued in U.S. Appl. No. 13/110,427 on Mar. 2, 2012; 7 pages.

Notice of Allowance issued in U.S. Appl. No. 13/540,263 on Sep. 5, 2012; 9 pages.

Office Action issued in U.S. Appl. No. 13/620,495 on Feb. 7, 2013; 8 pages.

Notice of Allowance issued in U.S. Appl. No. 13/620,495 on Apr. 25, 2013; 8 pages.

* cited by examiner

FREQUENCY AGILE DUPLEX FILTER

CROSS-REFERENCE TO RELATED APPLICATIONS

This is a Continuation Application of U.S. patent application Ser. No. 13/620,495 filed on Sep. 14, 2012, which is a Continuation Application of U.S. patent application Ser. No. 13/540,263 filed on Jul. 2, 2012, now U.S. Pat. No. 8,351,889, which is a Divisional Application of U.S. patent application Ser. No. 13/110,427 filed on May 18, 2011, now U.S. Pat. No. 8,213,877, which is a Continuation Application of U.S. patent application Ser. No. 12/717,026 filed on Mar. 3, 2010, now U.S. Pat. No. 7,970,354, which is a Divisional Application of U.S. patent application Ser. No. 11/615,450, filed on Dec. 22, 2006, now U.S. Pat. No. 7,702,295 issued on Apr. 20, 2010, all entitled "Frequency Agile Duplex Filter," which are hereby incorporated by reference herein in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to wireless networks, and more specifically to the frequency selection function of wireless transceiver systems. The invention is particularly advantageous with respect to the provision of a common hardware platform for multiple wireless standards, frequency bands and frequency channels. The approach used in the invention can be applied to any generic radio transmission platform, such as commonly found in satellite and terrestrial communication systems. The disclosed embodiments apply the invention to the base station transceiver of terrestrial wireless communications systems but it is equally applicable to mobile terminals.

BACKGROUND OF THE INVENTION

Examples of current wireless communications systems are Code Division Multiple Access (CDMA) networks, such as those compliant with existing and evolving 3GPP and 3GPP2 specifications, TD-CDMA, TD-SCDMA, WiMAX (i.e., IEEE §802.16) and IEEE §802.20 compliant networks. CDMA technology, for example, allows multiple cellular phone users to share the same frequency spectrum, and uses a code spread carrier with a different and essentially orthogonal instance of the spreading code assigned to each mobile unit within a cell. The base station receiver in a CDMA station correlates the received signal from a mobile unit with the desired de-spreading code, extracting the transmitted digital signal with a sufficient signal-to-noise ratio to achieve a satisfactory data error rate.

Filters are commonly used to remove unwanted noise from signals. One of limitations of filters in the past has been the need to configure filters for specific applications and receive bands. A high quality filter which can be electronically re-configured for MultiBand operation without the need to manually adjust or to change the physical filters is desirable.

SUMMARY OF THE INVENTION

One of the embodiments disclosed is an electronically adjustable signal filter system, which comprises a first filter coupled to an antenna coupling network and a second filter, a power amplifier coupled to the first filter, an antenna connected to an antenna coupling network, a pilot tone generator coupled to the first filter, and a first signal source connected to the power amplifier and first filter. In this embodiment, the power amplifier amplifies the first signal, the first filter places a notch into the first signal transmitted to the antenna coupling network, the antenna coupling network combines the first signal and a second signal received from the antenna and transmits a third signal to the second filter.

Another embodiment disclosed is a signal filter, which comprises a first vector modulator, a second vector modulator, a third vector modulator coupled to a microprocessor, and a signal input line coupled to the first vector modulator. This embodiment may also comprise a pilot tone generator coupled to the second vector modulator. In this embodiment, the first vector modulator and third vector modulator are capable of generating transmit cancellation signals which when are combined with the transmit signal which results in transmit signal cancellation at and beyond the physical point of signal combination. Also in this embodiment, the second vector modulator is capable of generating a receive noise cancellation signal which when combined with the receive band noise results in receive band noise cancellation at and beyond the physical point of combination.

Another disclosed embodiment is a method of filtering which comprises removing a spectrum component from a first signal, the first signal consisting of a high power transmit signal and low power receive band noise signal at frequencies corresponding to the receive band of the system to generate a second signal. This method also comprises applying the second signal to a coupling network creating a third signal and forth signal, wherein the third signal consists of a first transmit signal and a first suppressed receive band noise signal fed to an antenna, and the fourth signal consists of a second transmit signal and a second suppressed receive band noise signal fed through to a receiver. In addition, this method also comprises applying the third signal to a radiating element creating a fifth signal and a sixth signal, wherein the fifth signal is radiated from the antenna and the sixth signal is reflected from the antenna, and the fifth signal and the fourth signal in the coupling network creates a seventh signal. In addition, this method also comprises applying the seventh signal to a receive band filter creating an eighth signal, wherein the receive band filter removes the transmit signal power from the seventh signal, as well as transmitting the eighth signal to the receiver.

Other aspects and features of the present systems and methods will become apparent to those ordinarily skilled in the art upon review of the following description of specific embodiments of the present disclosure in conjunction with the accompanying figures.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents. It is further understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection. The terms transmit, transmitted, or transmitting are intended to include, but not be limited to, the electrical transmission of a signal from one device to another.

Figure 1:
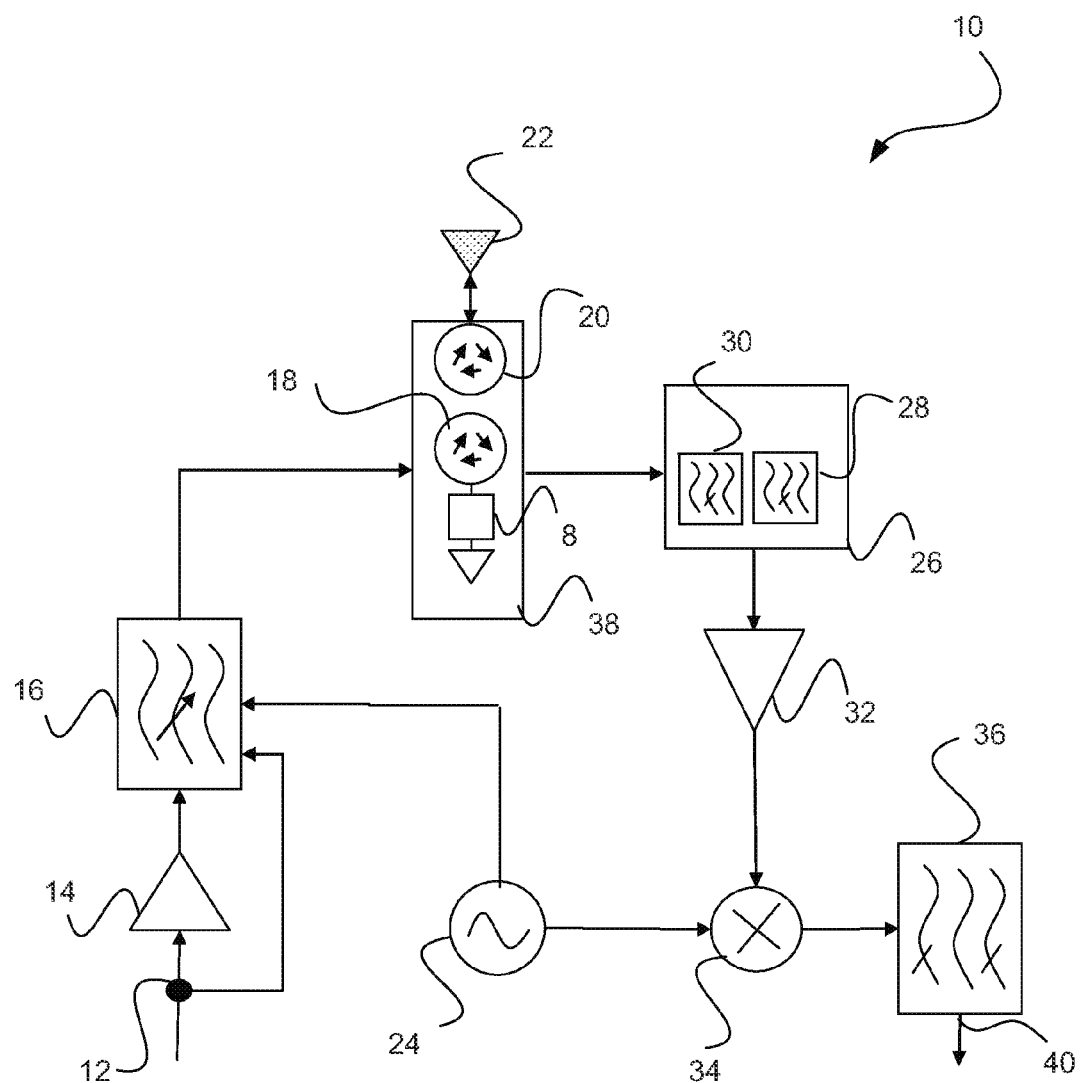
FIG. 1 is an overview of one embodiment of a system for signal processing using a frequency agile duplex filter.

In an embodiment, a system 10 for signal processing using a frequency agile duplex filter is shown in FIG. 1, wherein a signal is introduced via an input signal line 12 split and transmitted to a power amplifier (PA) 14 and a frequency agile band stop filter (FABSF) 16. PA 14 amplifies the signal and transmits the amplified signal into FABSF 16, which filters the combined signal from PA 14 and input signal line 12. FABSF 16 transmits the signal into a switched circulator bank 38 coupled to antenna 22. The switched circulator bank 38 may comprise a first circulator 18 and a second circulator 20 for multi-band operation. The output from the switched circulator bank 38 is then transmitted to a switched bank of transmit band reject filters 26 having a first transmit band reject filter 28 and a second transmit band reject filter 30 for multi-band operation. The output from the switched bank of transmit band reject filters 26 is transmitted to a low noise amplifier 32, amplified and transmitted to a down conversion mixer 34, and down mixed and transmitted to intermediate frequency (IF) filter 36. IF filter 36 removes the blocker component from the signal transmitted to IF filter 36 and exits system 10 through output signal line 40.

It is understood that a pilot tone generator may be connected to the system in any way known to one skilled in the art, and is illustrated as pilot tone generator 24 which is connected to down conversion mixer 34 and FABSF 16 so as to ensure the FABSF frequency notch, or other spectrum component, is aligned with the receive band of the base station. Pilot tone generator 24 which is connected to FABSF 16 and down conversion mixer 34 may also ensure that the FABSF 16 frequency notch is aligned with the receive channel of the base station. In one embodiment, system 10 for signal processing using a frequency agile duplex filter performs frequency agile duplex filtering through a combination of electronic feed forward vector cancellation (e.g., FABSF 16) and switched filter banks (e.g., via switched circulator bank 38 and switch bank of transmit band reject filters 26) enabling the operation of a base station over multiple frequency bands without the requirement to change the front end filter components. One of the innovative features of the present disclosure is the use of vector cancellation to suppress receive band noise generated by the power amplifier and to isolate the sensitive noise cancellation circuit from the transmit power. Use of vector cancellation enables a low loss, high power filter structure to be synthesized that is frequency agile.

In the embodiment illustrated by FIG. 1, an input signal is passed to both PA 14 and FABSF 16. The input signal to PA 14 is used to cancel the transmit signal at the input to FABSF 16, wherein FABSF 16 contains at one noise processing component. The input signal to PA 14 is made up substantially of a signal which includes a low level of receive band noise, and the input to FABSF 16 includes the signal which includes a high level of receive band noise, the output from PA 14, and the output from pilot tone generator 24. Cancellation of the transmit signal from the input to the FABSF noise processing circuits is necessary in order that the FABSF 16 acts on the pilot tone from pilot tone generator 24 and receive band noise, and that FABSF 16 is not saturated by the transmit power. The output of FABSF 16 therefore substantially consists of the transmit signal with the noise in the receive band of the PA 14 output containing a notch created by FABSF 16. The signal transmitted from FABSF 16 is fed into switched circulator bank 38 which is used to select the circulator appropriate for the band of operation.

In the example shown in FIG. 1, a first circulator 18 and second circulator 20 are illustrated within switched circulator bank 38. However, it is expressly understood that any number of circulators may be present within switched circulator bank 38, and it is understood that there may be any number of paths within switched circulator bank 38. The switched circulator bank 38 may further comprise isolation port termination device 8 which, in some embodiments, prevents power that is reflected by switch bank of transmit reject band filters 26 from to returning to FABSF 16. In one embodiment, switched circulator bank 38 combines the output from FABSF 16 with a signal received from antenna 22. The VSWR (voltage standing wave ratio) of antenna 22 and the finite isolation of the circulator results in a finite amount of transmit power appearing in the receive path transmitted from switched circulator bank 38. This input signal is then transmitted to switched bank of transmit band reject filters 26. It should be noted that although circulators are used in the current embodiment the system is not restricted to just the use of circulators but can use any antenna coupling network understood by one skilled in the art. It is further understood that the antenna coupling network may, in some embodiments, containing a radiating element capable or transmitting one or more signals.

In some embodiments, switched bank of transmit band reject filters 26 is used to suppress the transmit power leaking from switched circulator bank 38 into receive band, wherein the transmit power leakage may be less than 30 dB (circulator isolation) allowing the filter bank to be low power and small. It is expressly understood that there may be any number of filters contained within switched bank of transmit band reject filters 26, including, but not limited to, first transmit band reject filter 28 and a second transmit band reject filter 30. It is further understood that the switched bank of transmit band reject filters 26 may also force a signal to go through multiple filters in series, whereby a signal is filtered multiple times within switched bank of transmit band reject filters 26.

The output signal from switched bank of transmit band reject filters 26 is amplified by low noise amplifier 32. The output from low noise amplifier 32 is then down-converted through down conversion mixer 34 and passed into IF filter 36. In an embodiment, the IF filter 36 receives a, amplified signal. IF filter 36 is capable, in some embodiments, of filtering the incoming blocker signal level to be within the dynamic range an analogue to digital converter (ADC) which is external to the illustrated system 10. IF filter 36, in some embodiments, may be applied at baseband (DC or near DC) as opposed to an IF frequency, as in the application of a direct conversion receiver.

Pilot tone generator 24, in some embodiments, uses the receive chain radio frequency local oscillator (RFLO) to act as the pilot tone generator for FABSF 16 ensuring FABSF 16 notch tracks the receive band selected.

The output signal in output signal line 40, in one embodiment, is a product of the combined signal from input signal line 12 and the signal which is received through antenna 22. The output signal in output signal line 40 further has noise removed from the input signal transmitted through input signal line 12. Therefore, the signal in output signal line 40 is a filtered output signal created from the combination of the input signal in input signal line 12 and the signal received through antenna 22.

Figure 2:
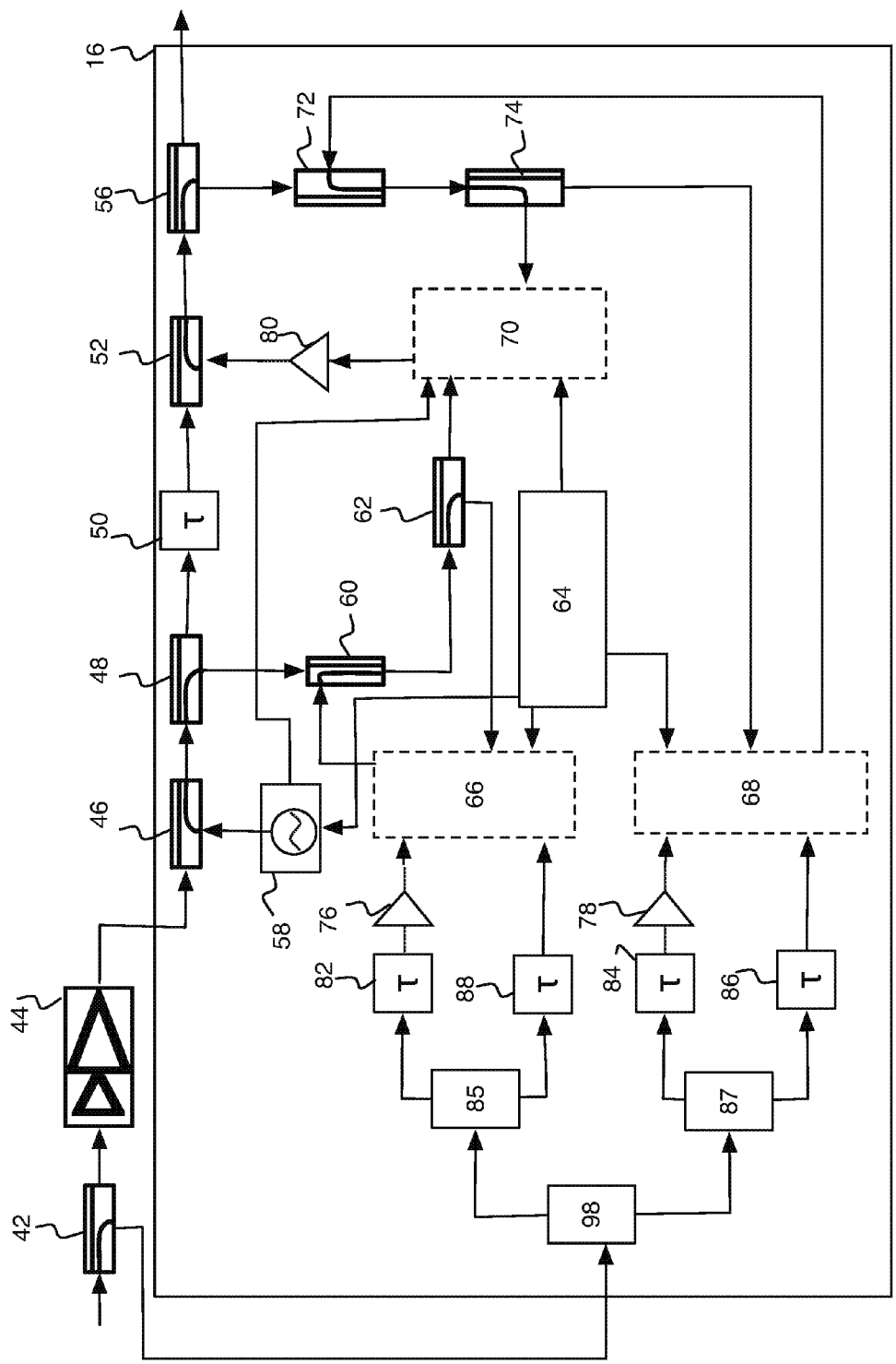
FIG. 2 is an overview of one embodiment of a frequency agile band stop filter used in the frequency agile duplex filter.

FIG. 2 is an illustrative embodiment of FABSF 16. In this example, FABSF 16 consists of three adaptive vector modulators (AVM) illustrated as a first AVM 66, second AVM 68, and a third AVM 70. A signal is split using signal splitter 42 that is connected to the input of PA 44 and power splitter 98. Embodiments may consist of any combination, distribution or arrangement of signal splitters, delay elements and AVM PA elements to couple the output of signal splitter 42 to the input of first AVM 66 and to the input of second AVM 68. In this embodiment, there are several paths in which a signal may pass. The phrases contained herein referring to the general location of an element within FIG. 2 (e.g., "top") are intended as guidance only in reference to the corresponding figure, and are not intended to be limiting. In addition, the phrase "signal joiner" is intended to refer to the node wherein two signals are joined into a single signal, and the phrase "signal splitter" is intended to refer to the node wherein one signal is split into two separate signals. It is expressly understood that the signal splitter and signal joiner may be implemented in any way known to one skilled in the art. A signal joiner, in some embodiments, may be implemented as a cancellation coupler in which the "transmit signal" is cancelled in the noise cancellation residual detection path. It is expressly understood that PA 44 and signal splitter 42 may, in some embodiments, be excluded from the FABSF 16 device and therefore appears in FIG. 2 for illustrative purposes.

As shown at the top left corner of FIG. 2, PA 44 amplifies the signal from signal splitter 42 and transmits the signal into signal joiner 46. Signal joiner 46 joins a pilot tone from pilot tone generator 58 and the signal from PA 44, then passes the combined signal into signal splitter 48. Signal splitter 48 transmits a signal into main path element 50, which then passes a modified signal into signal joiner 52. For the purpose of clarity, the path from signal splitter 42 to signal splitter 56 along the top of FIG. 2 shall be referred to as the main path and constitutes a low loss path for the transmit signal.

Power splitter 98 transmits a signal to power splitter 85 and power splitter 87. Power splitter 85 splits the signal from power splitter 98 and transmits a first signal to first AVM first delay element 82 and a second signal to first AVM second delay element 88. First AVM first delay element 82 applies a delay to the incoming signal, and passes the signal into first AVM PA 76. Power splitter 87 splits the signal from power splitter 98 and transmits a first signal to second AVM first delay element 84 and a second signal to second AVM second delay element 86. Second AVM first delay element 84 applies a delay to the incoming signal, and passes the signal into second AVM PA 78.

First AVM 66 accepts input first AVM second delay element 88, first PA AVM PA 76, signal splitter 62, and microprocessor 64. Microprocessor 64 is used to alter or control the operational parameters of first AVM 66, including the ability to electronically re-align first AVM 66 to new frequencies making the system frequency agile. First AVM 66 is capable of generating an optimized "transmit signal" cancellation vector and generates an output signal that is transmitted to signal joiner 60. The term "transmit signal" is intended to, but not limited to, refer to the modulated carrier containing the information to be transmitted by system 10 and is not intended to, but not limited as such, to include reference to other spectral components such as noise and intermodulation products which may normally be generated by PA 44 and hence be present in the output spectrum of the PA 44. Signal joiner 60 is a cancellation coupler by means of which the "transmit signal" is cancelled in the noise processing feed-forward path. Cancellation of transmit signal may be necessary in order that third AVM 70 in the noise processing feed-forward path is not saturated by the high transmit power level. In some embodiments, a single instance of the output from signal splitter 42 may be coupled to first AVM 66 by means of a delay element and AVM PA element, as in an example application where a power detector element would be used within the AVM element as opposed to an IQ demodulator element, in which case no reference signal would be required to detect the error signal.

Second AVM 68 accepts input from second AVM PA 78, second AVM second delay element 86, microprocessor 64, and signal splitter 74. Microprocessor 64 is used to alter or control the operational parameters of second AVM 68, including the ability to electronically re-align second AVM 68 to new frequencies making the system frequency agile. Second AVM 68 is capable of generating an optimized "transmit signal" cancellation vector and generates an output signal that is transmitted to signal joiner 72. Signal joiner 72 is a cancellation coupler by means of which the "transmit signal" is cancelled in the noise cancellation residual detection path. Cancellation of the transmit signal is necessary in order that third AVM 70 is not saturated by the high transmit power level. In some embodiments, a single instance of the output from signal splitter 42 may be coupled to second AVM 68 by means of a delay element and AVM PA element, as in an example application where a power detector element would be used within the AVM element as opposed to an IQ demodulator element, in which case no reference signal would be required to detect the error signal.

Third AVM 70 accepts a signal from signal splitter 62, microprocessor 64, pilot tone generator 58, and signal splitter 74. Third AVM 70 also outputs a signal to third AVM PA 80, and third AVM PA 80 amplifies the output signal from third AVM 70 and transmits the amplified signal into signal joiner 52. Third AVM 70 is capable of generating an optimized "receive band noise" cancellation vector and generates an output signal that is transmitted to third AVM PA 80. As with first AVM 66 and second AVM 68, microprocessor 64 is used to alter or control the operational parameters of third AVM 70, including the ability to electronically re-align third AVM 70 to new frequencies making the system frequency agile. In some embodiments, third AVM PA 80 could be located at any node or distributed between any nodes of the feedforward noise processing path between signal splitter 48 and signal joiner 52.

One of the innovative features of the present disclosure is that the system 10 for signal processing using a frequency agile duplex filter is capable of processing the noise generated in the receive channel of the system rather than filtering the transmit power. As a result of processing the receive band noise, the linearity and power handling requirements of the vector modulator are significantly reduced in the signal cancellation path as compared with an architecture in which the transmit power was also present in the cancellation loop.

Signal joiner 60 is located near the middle of FIG. 2. Signal joiner 60 accepts the signal from signal splitter 48 and first AVM 66 and transmits the joined signal into signal splitter 62. Signal splitter 62 transmits the signal from signal joiner 60 to both second AVM 68 and third AVM 70. Signal joiner 52 joins the signal from third AVM PA 80 and main path element 50 and outputs signal into signal splitter 56. Signal splitter 56 outputs a signal to an output signal line, and into signal joiner 72. Signal joiner 72 combines the signal from second AVM 68 and signal splitter 56 and creates an output that is transmitted into signal splitter 74. Signal splitter 74 outputs the signal from signal joiner 72 into both second AVM 68 and third AVM 70. Microprocessor 64 is used to alter the operation of first AVM 66, second AVM 68, and third AVM 70.

Main path element 50, first AVM first delay element 82, and second AVM first delay element 84 which appear as the tau symbol, are time delay elements which may, in some embodiments, have a frequency dispersive (e.g., depending on the frequency the delay will be different) characteristic. It is envisioned that, in some embodiments, the delay should be long enough such that the main path signal experiences the same delay by main path element 50 as the feedforward path cancellation signal being injected at signal joiner 52. Since the delay and the various signal processing blocks of FABSF 16 may have different dispersive characteristic in frequency, cancellation at specific frequencies can be determined by the phase shift introduced by the vector modulator present in the feedforward path of cancellation loops. First AVM first delay element 82 and second AVM first delay element 84 may also precede first AVM PA 76 and second AVM PA 78 in some embodiments to introduce delays long enough such that the main path signals of individual transmit signal cancellation loops experience the same delay as the feedforward cancellation path of individual transmit signal cancellation loops being injected at signal joiner 60 and signal joiner 72.

In one exemplary embodiment, the output noise from the power amplifier 44 is cancelled by using a signal from first AVM 66. Through the input signal of PA 44, the receive band noise which is to be eliminated is not present because this noise is generated by the PA and as a result only occurs after a signal is generated by PA 44. The input to third AVM 70 consists of the pilot tone in the receive channel and the receive band noise. Therefore, in one embodiment, third AVM 70 generates a cancellation vector for the pilot and RX band noise signals. The error signal for the In-phase & Quadrature (IQ) demodulator of the third AVM 70 is obtained by using a signal that exits signal splitter 56 and using a signal generated by pilot tone generator 58 as a basis. The transmit signal is removed from the error signal sampled using signal joiner 72 by the feedforward cancellation signal generated by second AVM 68 leaving the error signal to enter the IQ demodulator of third AVM 70. Therefore, in some embodiments, first AVM 66 and second AVM 68 are used to generate the cancellation vectors which may be required to generate the cancellation signals used to cancel the transmit signal that would otherwise enter into third AVM 70. Therefore, third AVM 70 is able to generate the cancellation vector of a cancellation signal used to cancel the power amplifier noise present in the receive band. Cancellation of the transmit signal prior to application of signals to third AVM 70 is critical in order to prevent saturation of the third AVM 70.

In this embodiment, frequency adjustment of the cancellation notch formed by third AVM 70 is achieved by adjusting the center frequency of pilot tone generator 58. In some embodiments, the different frequency dispersive nature of the main path and feedforward cancellation path results in the phase of the feedforward cancellation signal being different depending on the frequency to be cancelled, and therefore the adjustment of the cancellation signal phase can alter the frequency at which cancellation occurs resulting in the frequency agility of the cancellation notch. One of the innovative features of the present disclosure is that through the phase lock signal created by pilot tone generator 58, the FABSF 16 can track channel and band frequency changes of the receiver of the base transceiver station.

Figure 3:
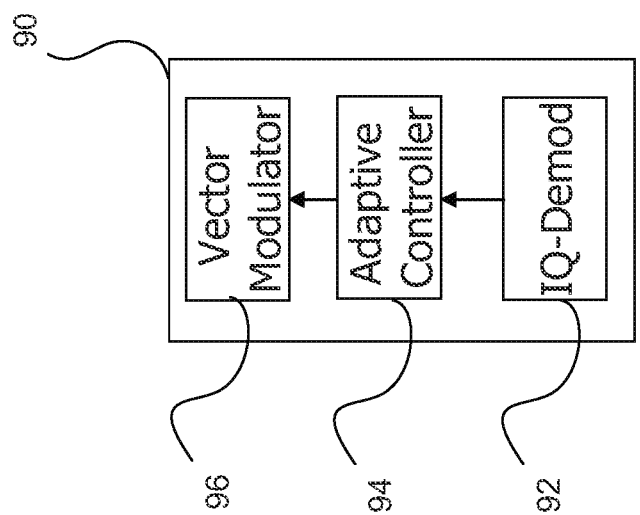
FIG. 3 is an overview of one embodiment of a vector modulator and associated adaptive control circuitry.

FIG. 3 is an example AVM 90. First AVM 66, second AVM 68, and third AVM 70 each are substantially similar to AVM 90. AVM 90 contains a radio frequency vector modulator 96, adaptive controller 94, and an IQ demodulator 92. IQ demodulator 92 is capable, in one embodiment, of generating a base band IQ signal from and error signal using a reference signal as basis. Adaptive controller 94 is capable of generating the IQ control signals which may be required to ensure vector cancellation and in addition contains the control loop filter. The radio frequency vector modulator 96 enables amplitude adjustment of the I (in-phase) and Q (quadrature-phase) signal components of the RF signal to be used as cancellation signal such that the cancellation signal is able to match the amplitude of, and is in anti-phase with, the RF signal counterpart to be cancelled in the main path of the respective feedforward cancellation loop. This is intended to be an exemplary model of an AVM module, and should not be interpreted to be limiting, i.e., this module may be subdivided into any number of elements, and any number of functions. In some embodiments I/Q demodulator 92 may be replaced by other types of detectors, including but not limited to: wideband receiver, narrow-band receiver, correlation detector, or tuned power detector. In some embodiments, the vector modulator 96 may be replaced by other types of vector modulators or arrangement of components that exhibit the function of vector modulator, which may consist of, but not limited to: polar vector modulator, variable phase shifter, variable attenuator, variable amplifier, variable impedance, signal splitter, signal joiner, delay elements and switches. In some embodiments, the error signal generated by IQ demodulator 92 and control signal used to control vector modulator 96 may consist of any combination of signal components that constitute a signal vector (or phasor). The adaptive controller 94 may consist of signal processing elements that may be implemented in part, or in whole, in the analog domain or in the digital domain, such as, but not limited to: digital signal processing algorithms implemented in a digital signal processor (DSP), analog filters, digital-to-analog converter (ADC) and analog-to-digital converter (DAC).

Figure 4:
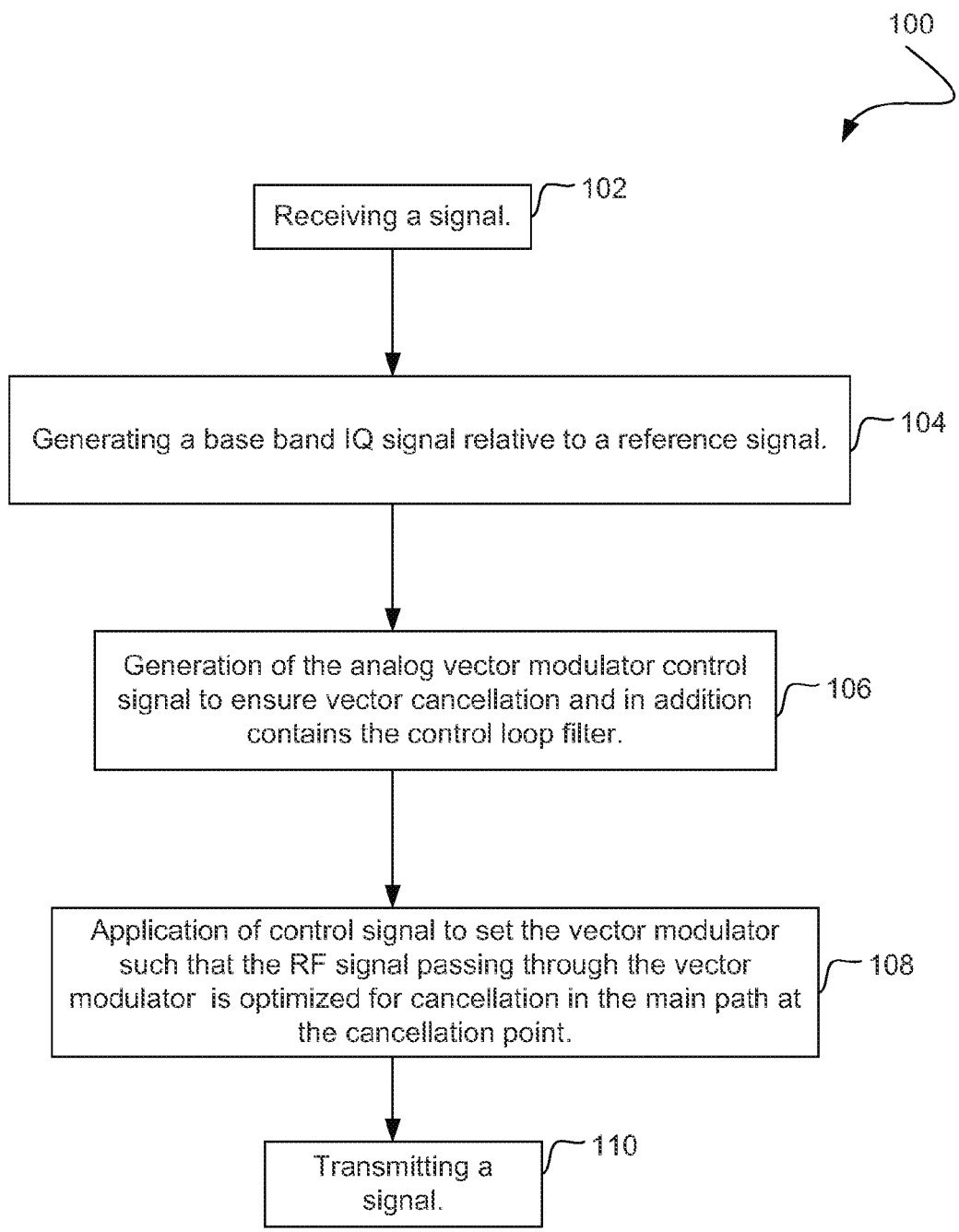
FIG. 4 is a flowchart of one method of operation of adaptively configuring a vector modulator to generate a cancellation signal from the input signal.

FIG. 4 is a flowchart of one method of operation of AVM 100. In this embodiment, AVM 100 receives a signal (Block 102). AVM 100 generates a base band IQ signal using a reference signal as basis (Block 104). In addition, AVM 100 generates an analog vector modulator control signal which contains the control to ensure vector cancellation and contains the control loop filter. (Block 106). AVM 100 also applies the control signal to set the vector modulator such that the RF signal passing through the vector modulator is optimized for cancellation in the main path. (Block 108). In addition, AVM 100 transmits the amplitude and phase adjusted (modulated) RF signal (Block 110).

Figure 5:
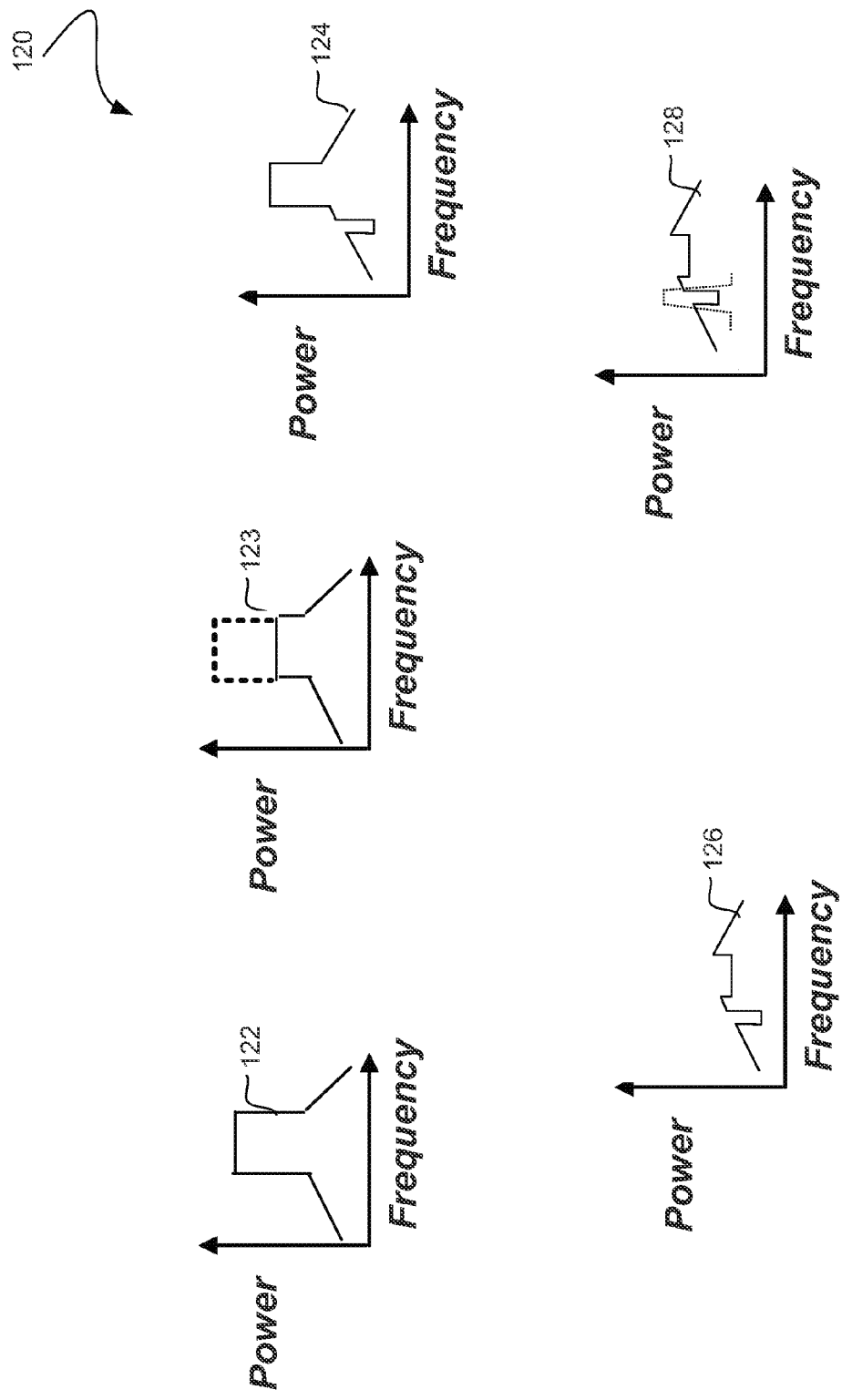
FIG. 5 is a group of illustrations of several RF signals generated by a system for signal processing using a frequency agile duplex filter.

FIG. 5 is an illustration of one or several RF signals 120 generated by the system 10 for signal processing using a frequency agile duplex filter as illustrated by FIG. 1 at various stages. Graph 122 is a plot of power verses frequency of a signal that is received by FABSF 16 from PA 14. Graph 123 is a plot illustrating the decrease in power which results from the use of the first AVM 66. Graph 124 is a plot of the signal that is transmitted by FABSF 16 illustrating that a receive band notch has been created in PA 14 noise floor. The signal is then transmitted from FABSF 16 into the switched bank of transmit reject filter, wherein another signal is created which is shown as Graph 126. The notch created by FABSF 16 is still present, and some of the signal at the high end of the power range has been removed. Graph 128 is a plot of the signal transmitted by IF filter 36 that removes blocker signal and residual transmit leakage. The residual transmit leakage is illustrated in graph 128 by a solid line and the pass band of the IF filter by the dotted line.

Figure 6:
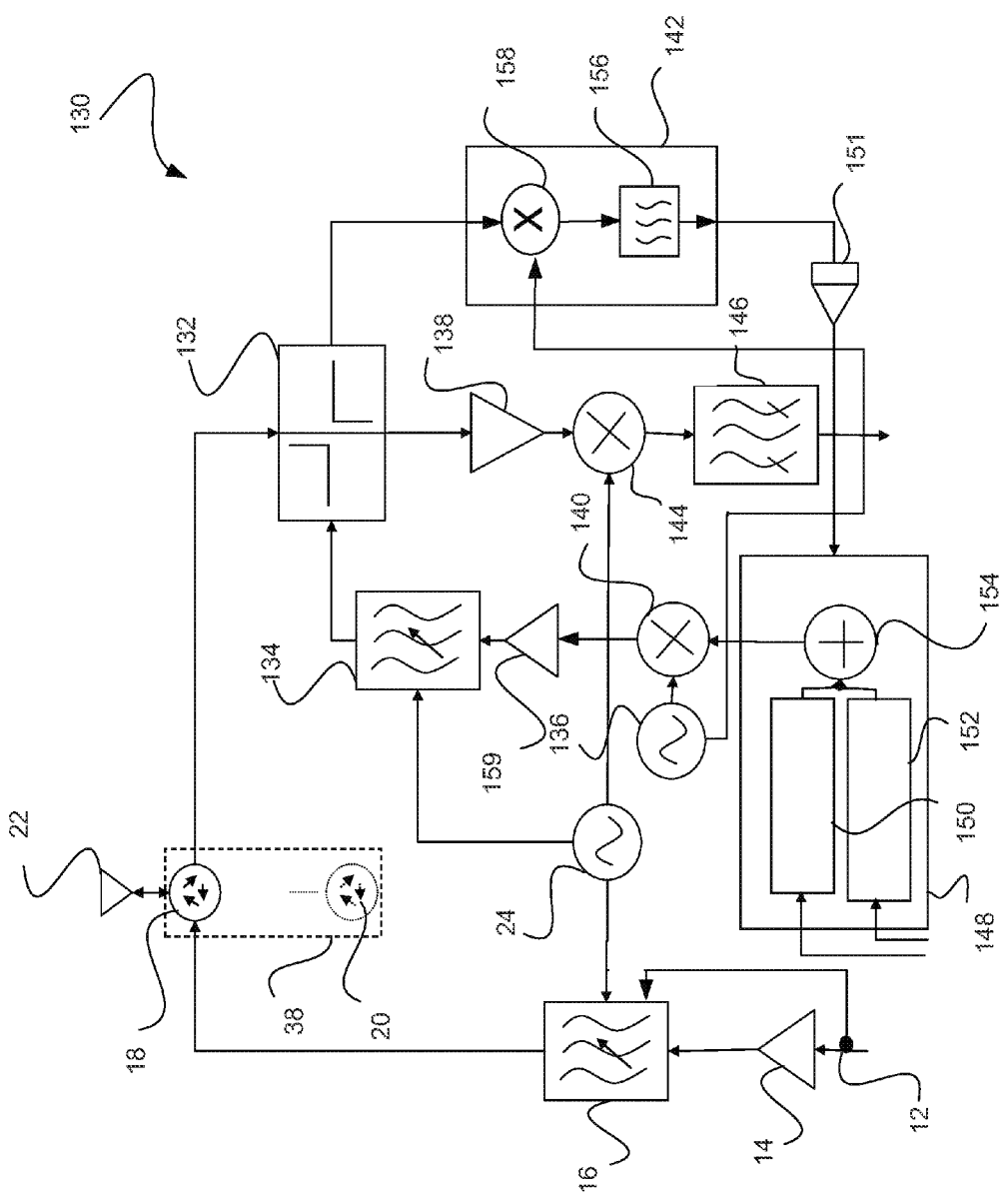
FIG. 6 is an overview of another embodiment of a system for signal processing using a frequency agile duplex filter.

FIG. 6 is another embodiment of a system 130 for signal processing using a frequency agile duplex filter. In this embodiment, a signal is introduced into a PA 14 and FABSF 16 through an input signal line 12. The input signal to PA 14 of the input signal traveling through input signal line 12 is used to cancel the transmit signal at the input of FABSF 16 noise processing circuits. Cancellation of the transmit signal is desirable so that FABSF 16 feedforward noise cancellation loop only acts on the pilot tone and receive band noise and is not saturated by the relatively high power of the transmit signal. The output from FABSF 16, in some embodiments, substantially consists of the transmit signal. Noise in the receive band of the PA 14 output has been notched out by FABSF 16. The signal transmitted from FABSF 16 is fed into switched circulator bank 38 that is set to select the circulator appropriate for the band of operation. In the example shown in FIG. 6, a first circulator 18 and second circulator 20 are illustrated in switched circulator bank 38. However, it is expressly understood that any number of circulators may be present. The VSWR of antenna 22 and the finite isolation of the circulator bank results in a finite amount of transmit power appearing in the path transmitted from switched circulator bank 38.

In this embodiment, unlike the example shown in FIG. 1, the signal from switched circulator bank 38 is transmitted into CP 132. CP 132, in one embodiment, contains two couplers which include a signal canceller coupler and an error sampling coupler. The function of CP 132 could also be comprised within the architecture of a balanced low noise amplifier (LNA) by someone skilled in the art. CP 132 transmits an error signal that is used to optimize echo and feed-through cancellation to digital signal processor (DSP) 148. The transmit error signal received from CP 132 is used by DSP 148 to optimize the cancellation of antenna reflection and circulator feed-through in the receive chain, referred individually or collectively hereafter as "echo" signal. Antenna reflection may consist of the part of a signal input to switched circulator bank 38, which is output from switched circulator bank 38 via bi-directional port common between switched circulator bank 38 and antenna 22, and which is then reflected at the antenna 22 due to non-ideal matching conditions between the free-space RF propagation channel outside system 130 and antenna 22 and/or the bi-directional RF connection between switched circulator bank 38 and antenna 22. The reflected signal is then redirected from antenna 22 to the input of switched circulator bank 38 via the bi-directional RF connection common to the switched circulator bank 38 and antenna 22, and is then coupled to the output of switched circulator bank 38 as input to CP 132. Circulator feed-through may consist of a part of the signal input to the switched circulator bank 38, which is immediately coupled to the output of switched circulator bank 38 due to non-ideal characteristic of switched circulator bank 38, and then input to CP 132. The error signal from CP 132 is down converted to within the sampling band of an ADC which enables the error signal to be processed by DSP 148. DSP 148 transmits a modified signal into an up conversion mixer 140, up conversion mixer 140 up converts the baseband DSP signal and transmits the up converted signal into FABSF 134. FABSF 134 accepts a signal from pilot tone generator 24, PA 159 and up conversion mixer 140. FABSF 134 filters noise generated in the receive band by preceding PA 159, and transmits the echo cancellation signals into CP 132. CP 132 transmits a signal into low noise amplifier 138 and to error signal processing element 142. Error signal processing element 142 down converts the signal from CP 132 in down converter 158, which then sends the down converted signal to filter 156. Filter 156 transmits a signal to an analog digital converter (ADC) 151 which converts the signal and passes the signal into DSP 148. DSP 148 may, in some embodiments, contain necessary signal processing circuitry to convert the signal from Filter 156 from the analog domain to the digital domain thereby removing the need for an ADC external to DSP 148. Low noise amplifier 138 amplifies the signal from CP 132, and then passes the signal into down conversion mixer 144. Down conversion mixer 144 down converts the incoming signal and then transmits the down converted signal into IF filter 146. The down-converted signal is subsequently IF filtered in IF filter 36 that brings the blocker signal level within the sampling dynamic range of the ADCs. In some embodiment where the LO signal of down conversion mixer 144 is at the same frequency as the receive channel frequency, as in the application of a direct conversion receiver, the IF filter 146 may be considered a baseband filter (DC or near DC).

DSP 148 contains signal combiner 154 as well as modules for the antenna echo canceller 150 and the feed through echo cancellation 152. DSP 148 could also contain a module for echo cancellation of signal components generated outside of system 130 which are correlated with the signals transmitted by antenna 22. The DSP feeds an output signal into up conversion mixer 140. Up conversion mixer 140 takes input from both DSP 148 and pilot tone generator 136. Pilot tone generator 136, in one embodiment, is a transmit local oscillator (TXLO) crystal which is used as the local oscillator for the up conversion mixer 140. Up conversion mixer 140 passes up converted signal into an auxiliary PA 159. PA 159 passes the amplified signal to FABSF 134 that also receives a signal from pilot tone generator 24. When combined, FABSF 134 removes the receive band noise generated by the PA 159 from the signal and transmits the up converted echo cancellation signals into the CP 132. Therefore, CP 132 coupler only sends through the receive signal whilst the antenna echo signal and circulator feed through at the transmit frequency are cancelled. In the embodiment of FIG. 6 the fixed bank of transmit band reject filters 26 present in FIG. 1 present in the receive path have been replaced by an adaptive transmit signal cancellation architecture. The embodiment of FIG. 6 consequently can be electronically steered to any desired frequency of operation.

Figure 7:
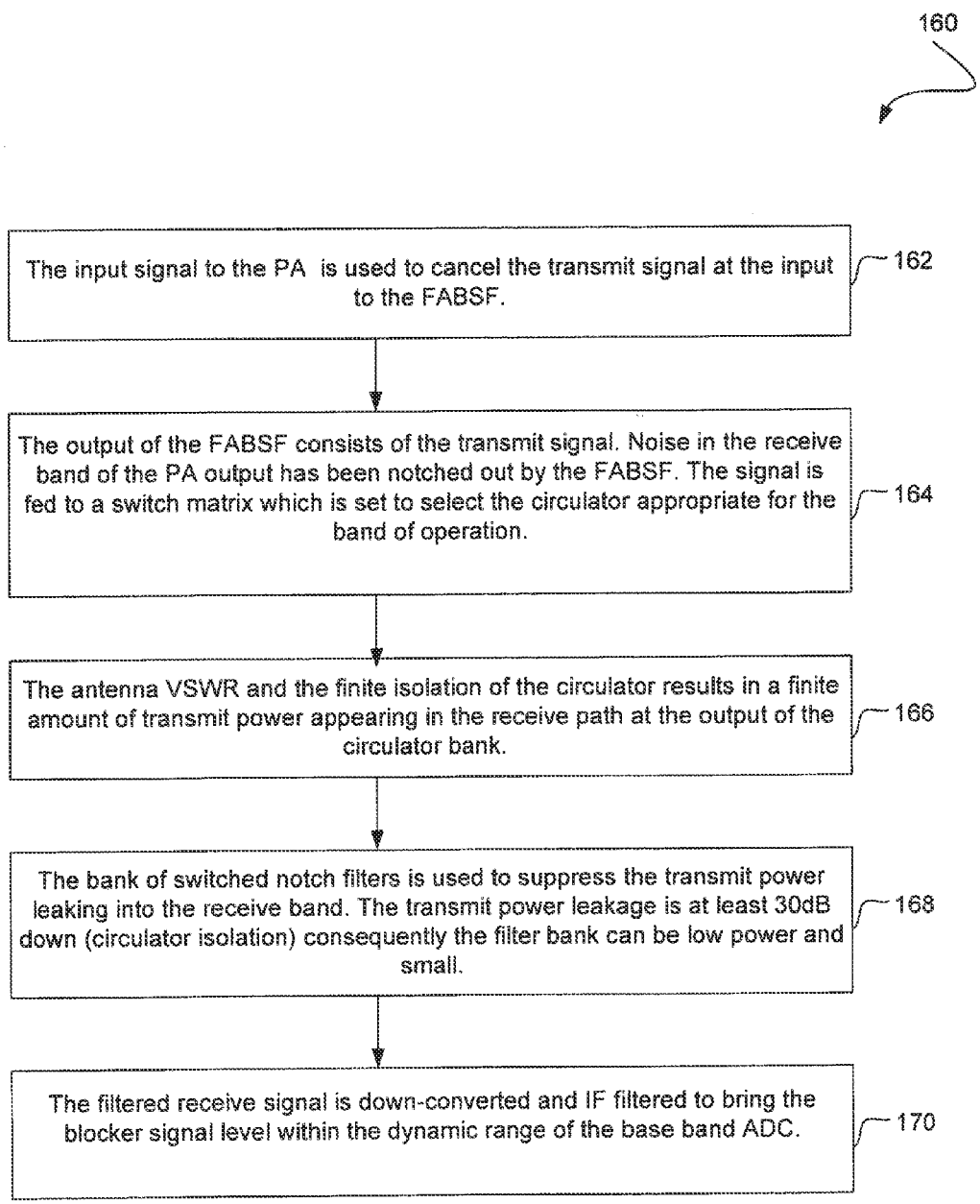
FIG. 7 is a flowchart of one method of operation for a system for signal processing using a frequency agile duplex filter.

FIG. 7 is a flowchart 160 that illustrates the operation of the system 10 for signal processing using a frequency agile duplex filter. In this example embodiment, the input signal to the PA is used to cancel the transmit signal at the input of noise processing circuits within FABSF (Block 162). The output of the FABSF consists of the transmit signal. Noise in the receive band of the PA output has been notched out by the FABSF. The signal is fed to a switch matrix which is set to select the circulator appropriate for the band of operation (Block 164). The antenna voltage standing wave ratio (VSWR) and the finite isolation of the circulator results in a finite amount of transmit power appearing in the receive path at output of switched circulator bank 38 and hence input of bank of switched notch filters (Block 166). The bank of switched notch filters is used to suppress the transmit power leaking into the receive band. The transmit power leakage may be at least 30 dB down (circulator isolation). The transmit signal leakage into the receive path is therefore low power which reduces the power handling requirements placed on the receive chain switched filter bank allowing the filter bank to be low power and small. Small size low power filter technology such as surface acoustic wave (SAW) filters can be employed. In other embodiments the bank of switch filters may be replaced in part, or in whole, by a FABSF component to perform or augment the same function (Block 168). The filtered receive signal is down-converted and IF (or baseband) filtered to provide channel selectivity and bring the blocker signal level within the sampling dynamic range of ADC (Block 170).

Figure 8:
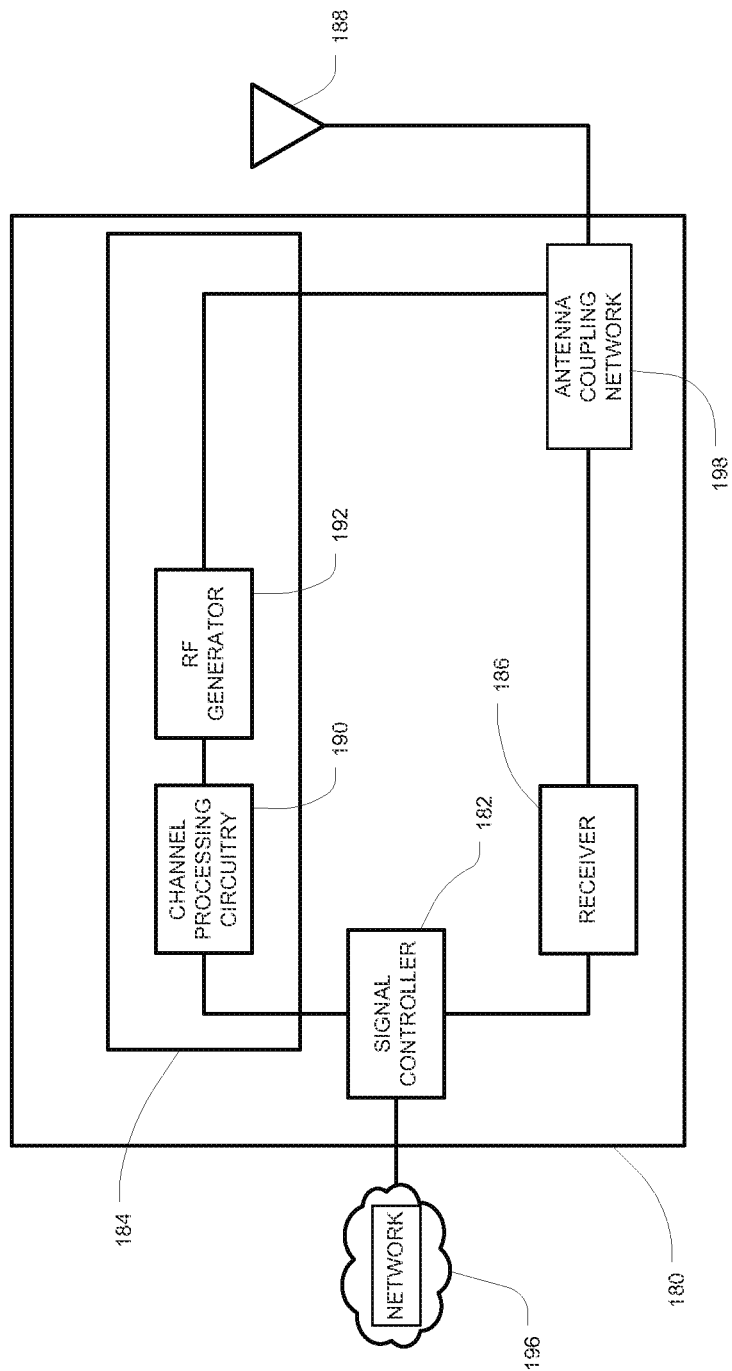
FIG. 8 is a block diagram of a base station.

As shown in FIG. 8, disclosed system 10 design may be incorporated as part of a signal controller 182 into a base station 180. Base station 180 is a medium to high-power multi-channel, two-way radio in a fixed location. While the illustrated example is that of a base station, it is expressly understood that any of the disclosed embodiments may be integrated into a mobile handset, network device, or any other communication device capable of sending and receiving electronic communications. Therefore, the disclosed example of a base station is for illustrative purposes only. Examples of devices that can use the disclosed innovations include, but are not limited to, low-power, single-channel or multi-channel, two-way radios or wireless devices such as mobile phones, portable phones, portable laptop computers, wireless routers and satellites. Base station 180 may comprise a signal controller 182 that is coupled to a transmitter 184 and a receiver 186. Transmitter 184 and receiver 186 (or combined transceiver) is further coupled to an antenna 188. In base station 180, digital signals are processed in signal controller 182. The digital signals may be signals for a wireless communication system, such as signals that convey voice or data intended for a mobile terminal (not shown). Base station 180 may employ any suitable wireless technologies or standards such as 2G, 2.5G, 3G, GSM, IMT-2000, UMTS, iDEN, GPRS, EV-DO, EDGE, DECT, PDC, TDMA, FDMA, CDMA, W-CDMA, TD-CDMA, TD-SCDMA, GMSK, OFDM, WiMAX (i.e., IEEE §802.16), IEEE §802.20, etc. Signal controller 182 then transmits the digital signals to transmitter 184, which includes a channel processing circuitry 190. Channel processing circuitry 190 encodes each digital signal, and a radio frequency (RF) generator 192 modulates the encoded signals onto an RF signal. The resulting output signal is transmitted over antenna 188 through an antenna coupling network 198 to the mobile terminal. Antenna 188 also receives signals sent to base station 180 from the mobile terminal. Antenna 188 transmits the signals to receiver 186 that demodulates them into digital signals and transmits them to signal controller 182 where they may be relayed to an external network 196. Base station 180 may also comprise auxiliary equipment such as, but not limited to, cooling fans or air exchangers for the removal of heat from base station 180.

Figure 9:
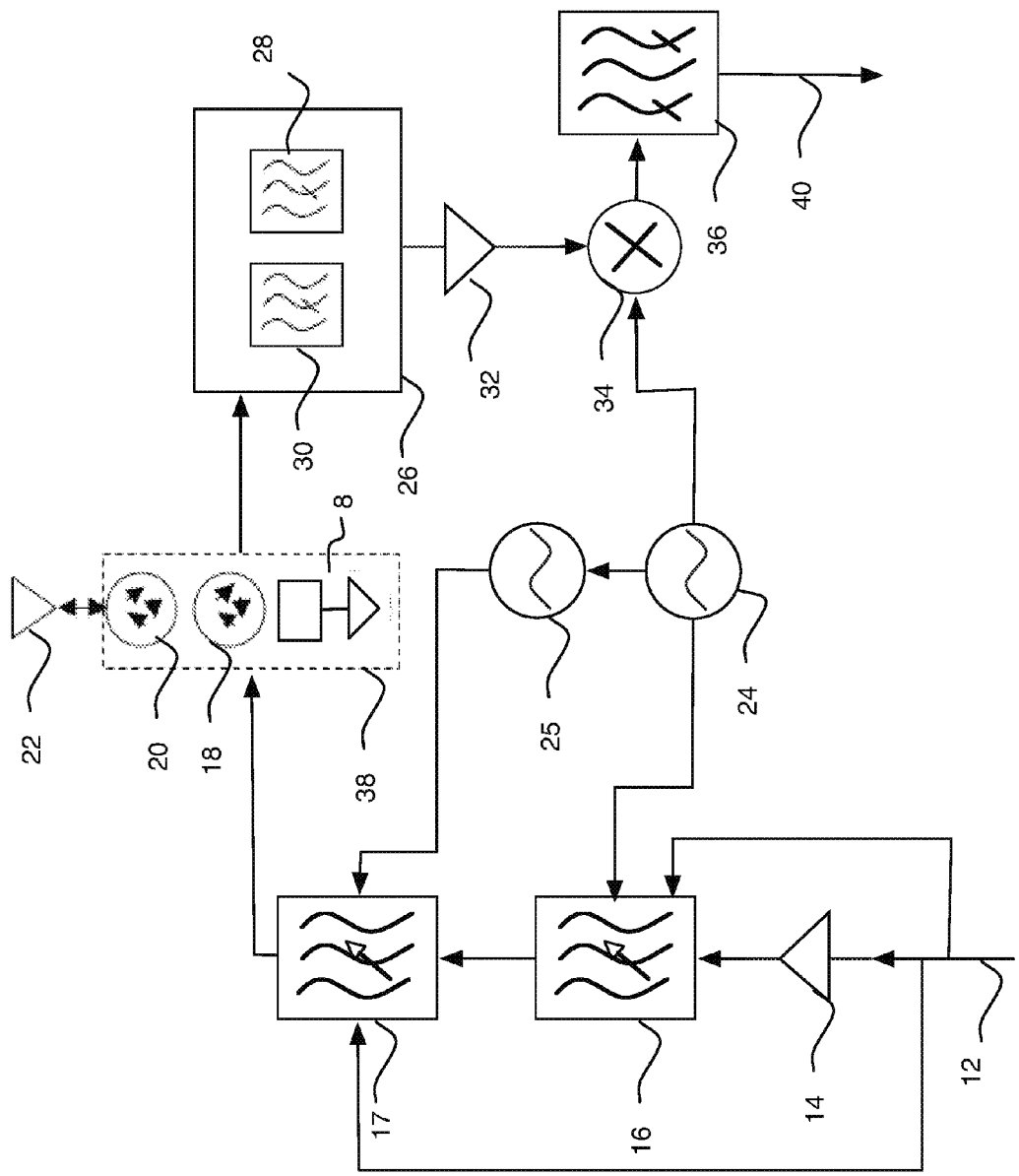
FIG. 9 is an overview of one embodiment of a system for signal processing using a frequency agile duplex filter wherein multiple notches are created.

While examples of system 10 wherein a single notch is created have been disclosed, it is expressly understood that any number of notches may be used consistent with this disclosure. FIG. 9 is an example of a system which is substantially similar to the embodiment illustrated in FIG. 1, with addition of a second pilot tone generator 25 and FABSF 17. Second pilot tone generator 25 is connected to FABSF 17 and may be connected in a slave relationship with pilot tone generator 24. In other embodiments, second pilot tone generator 25 may be maintained in phase lock with pilot tone generator 25, operated at an arbitrary frequency offset, or controlled by a microprocessor. FABSF 17 is connected in series in between FABSF 16 and switched circulator bank 38, and receives an input from signal input line 12. FABSF 17 is capable, in some embodiments, of creating an additional notch consistent with the operation of FABSF 16. In this way, multiple notches may be created. It is expressly understood that any number of notches may be created as known to one skilled in the art, and the embodiment shown in FIG. 9 of two notches is for illustrative purposes only.

Figure 10:
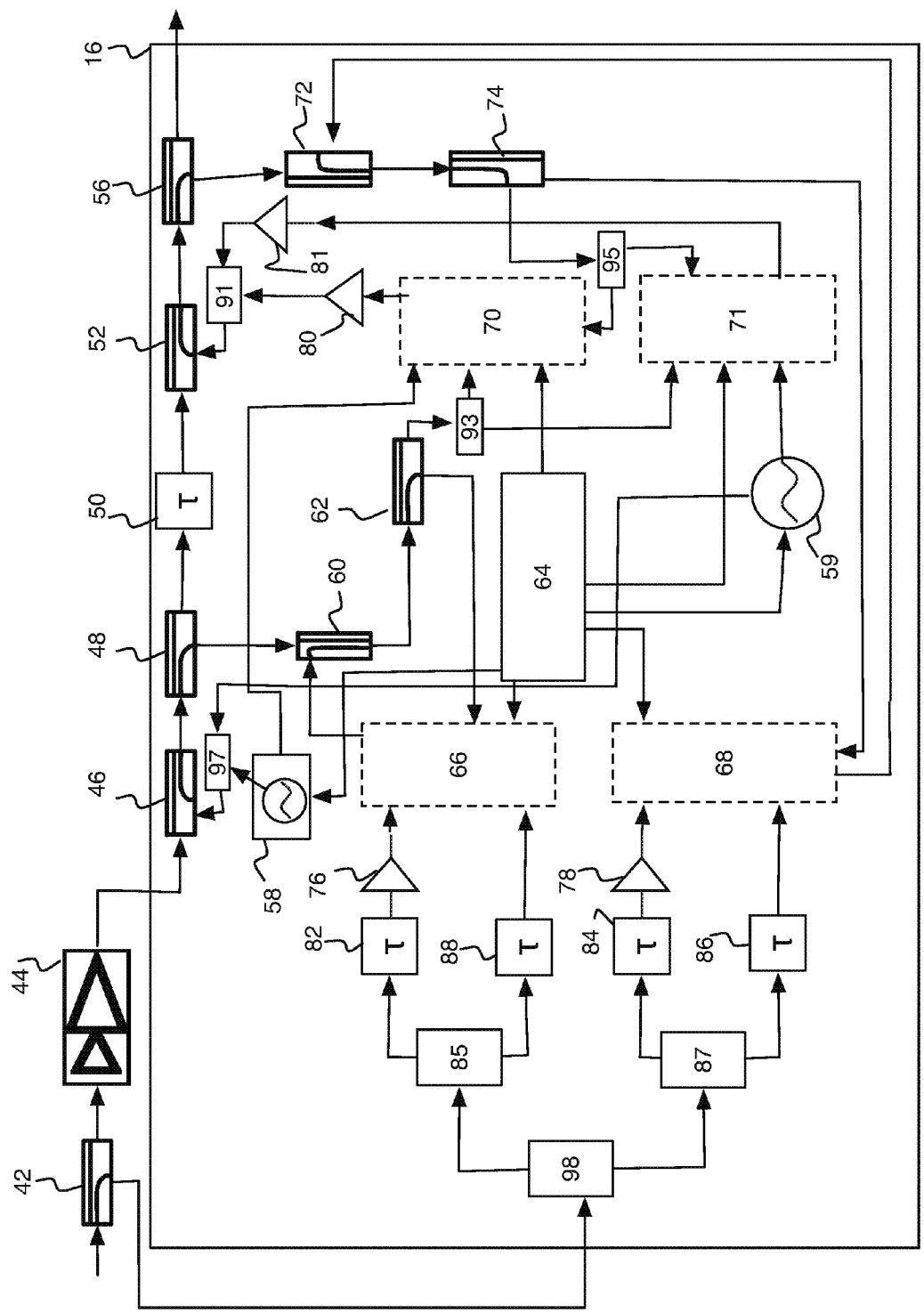
FIG. 10 is an overview of one embodiment of a frequency agile band stop filter used in the frequency agile duplex filter wherein multiple notches are created.

FIG. 10 is an example of a system 16 that may be used to create multiple vector cancellation signals. FIG. 10 is substantially similar for FIG. 2, with the addition of a fourth AVM 71, fourth AVM amplifier 81, and second pilot tone generator 59. In addition, power splitter 95, power splitter 93, power combiner 91, and power combiner 97 have been added. It is expressly understood that any connections mentioned in this paragraph, to the extent they create duplicative connections as those in FIG. 2, should replace those connections so as to remove any duplicative connections. Power combiner 91 accepts input from amplifier 81 and amplifier 80, combines the signals, and outputs the signals into signal joiner 52. Power splitter 95 splits input from signal splitter 74 and outputs the split signal into third AVM 70 and fourth AVM 71. Power splitter 93 splits output from signal splitter 62 and outputs the signal into third AVM 70 and fourth AVM 71. Power combiner 97 accepts input from first pilot tone generator 58 and second pilot tone generator 59, combines the signals, and outputs the signals into signal joiner 46.

In this embodiment, a signal from power splitter 93 is transmitted into fourth AVM 71. In addition, microprocessor 64 controls second pilot tone generator 59 and fourth AVM 71, second pilot tone generator 59 generates a signal that is transmitted into fourth AVM 71, and signal splitter 74 transmits a signal substantially similar to the signal transmitted into third AVM 70 into fourth AVM 71 through power splitter 95. Fourth AVM 71 is capable of generating an optimized "receive band noise" cancellation vector and generates an output signal that is transmitted into fourth ACM amplifier 81, amplified, and transmitted into to signal joiner 52 through power combiner 91. In this manner, the fourth AVM is capable of creating an additional cancellation vector which may be used in system 16. It is expressly understood that any number of AVM modules could be used in system 16.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The discussion of a reference in the Description of Related Art is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

It should be understood that although an exemplary implementation of one embodiment of the present disclosure is illustrated above, the present system may be implemented using any number of techniques, whether currently known or in existence. The present disclosure should in no way be limited to the exemplary implementations, drawings, and techniques illustrated above, including the exemplary design and implementation illustrated and described herein, but may be modified within the scope of the appended claims along with their full scope of equivalents.

While preferred embodiments of the present disclosure have been shown and described, modifications thereof can be made by one skilled in the art without departing from the spirit and teachings of the present disclosure. The embodiments described herein are exemplary only, and are not intended to be limiting. Many variations and modifications of the present disclosure disclosed herein are possible and are within the scope of the present disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of broader terms such as comprises, includes, having, etc. should be understood to provide support for narrower terms such as consisting of, consisting essentially of, comprised substantially of, etc.

What we claim as our invention is:

1. A method of signal processing, the method comprising:
performing frequency agile duplex filtering of an input signal at a wireless transceiver, wherein the frequency agile duplex filtering is accomplishing through a combination of (1) electronic feed forward vector cancellation, and (2) switched filter banks to enable operation of the wireless transceiver over multiple frequency bands without requiring a change in front end filter components.

2. The method of claim 1, wherein the electronic feed forward vector cancellation suppresses receive band noise generated by a power amplifier of the wireless transceiver.

3. The method of claim 1, wherein the electronic feed forward vector cancellation isolates a noise cancellation circuit of the wireless transceiver from transmit power.

4. The method of claim 1, wherein the electronic feed forward vector cancellation is performed by a Frequency Agile Band Stop Filter (FABSF) of the wireless transceiver.

5. The method of claim 4, the method further comprising:
receiving a signal from a pilot tone generator at the FABSF; and
using the signal received from the pilot tone generator at the FABSF to ensure that a FABSF frequency notch is aligned with a receive channel.

6. The method of claim 4, wherein the switched filter banks comprise a switched circulator bank that receives an output signal from the FABSF and selects a circulator appropriate for a band of operation.

7. The method of claim 6, wherein the switched filter banks further comprise a switch bank of transmit band reject filters that suppress transmit power leaking from the switched circulator bank.

8. The method of claim 1, the method further comprising:
receiving the input signal at both a power amplifier (PA) and the FABSF, wherein the input signal to the PA is used to cancel a transmit signal at an input to the FABSF.

9. The method of claim 1, the method further comprising:
receiving an output signal from the FABSF and a signal received from an antenna at the switched circulator bank such that a filtered output signal is generated by the wireless transceiver based upon the input signal and the signal received from the antenna.

10. A wireless transceiver for electronically adjustable signal filtering, the wireless transceiver configured to perform frequency agile duplex filtering of an input signal, wherein the frequency agile duplex filtering is accomplishing through a combination of (1) electronic feed forward vector cancellation, and (2) switched filter banks to enable operation of the wireless transceiver over multiple frequency bands without requiring a change in front end filter components.

11. The wireless transceiver of claim 10, wherein the wireless transceiver comprises a power amplifier, and the electronic feed forward vector cancellation suppresses receive band noise generated by the power amplifier.

12. The wireless transceiver of claim 11, wherein the electronic feed forward vector cancellation isolates a noise cancellation circuit of the wireless transceiver from transmit power.

13. The wireless transceiver of claim 10, wherein the electronic feed forward vector cancellation is performed by a Frequency Agile Band Stop Filter (FABSF) of the wireless transceiver.

14. The wireless transceiver of claim 13, wherein the wireless transceiver comprises a pilot tone generator, and the FABSF receives a signal from the pilot tone generator to ensure that a FABSF frequency notch is aligned with a receive channel.

15. The wireless transceiver of claim 13, wherein the switched filter banks comprise a switched circulator bank that receive an output signal from the FABSF and selects an circulator appropriate for a band of operation.

16. The wireless transceiver of claim 15, wherein the switched filter banks further comprise a switch bank of transmit band reject filters that suppress transmit power leaking from the switched circulator bank.

17. The wireless transceiver of claim 13, wherein an input signal is passed to both a power amplifier (PA) and the FABSF, and the input signal to the PA is used to cancel a transmit signal at an input to the FABSF.

18. The wireless transceiver of claim 10, the wireless transceiver further being configured to generate a filtered output signal that is based upon the input signal and a signal received from an antenna.

* * * * *

UNITED STATES PATENT AND TRADEMARK OFFICE
CERTIFICATE OF CORRECTION

| | | |
|---|---|---|
| PATENT NO. | : 8,655,301 B2 | Page 1 of 1 |
| APPLICATION NO. | : 13/928117 | |
| DATED | : February 18, 2014 | |
| INVENTOR(S) | : Alain Roussel and Charles W. T. Nicholls | |

It is certified that error appears in the above-identified patent and that said Letters Patent is hereby corrected as shown below:

On the Title Page

On Page 2, In Column 1 Item (56) (Other Publications), In Line 40, Delete "Ampliefiers" and insert -- Amplifiers --, therefor.

On Page 2, In Column 2 Item (56) (Other Publications), In Line 12, Delete "Carelton" and insert -- Carleton --, therefor.

On Page 2, In Column 2 Item (56) (Other Publications), In Line 26, Delete "Noice" and insert -- Noise --, therefor.

On Page 2, In Column 2 Item (56) (Other Publications), In Line 26, Delete "Ampliefiers" and insert -- Amplifiers --, therefor.

Signed and Sealed this
Twenty-fourth Day of June, 2014

Michelle K. Lee
*Deputy Director of the United States Patent and Trademark Office*